Sept. 10, 1929.  R. B. MILLARD  1,727,554
FILTER
Filed Oct. 2, 1928   2 Sheets-Sheet 1

INVENTOR.
R. B. Millard,
BY Irving L. McCathran
ATTORNEY.

Sept. 10, 1929.  R. B. MILLARD  1,727,554
FILTER
Filed Oct. 2, 1928  2 Sheets-Sheet 2

INVENTOR.
R. B. Millard,
BY
Irving L. McCathran
ATTORNEY.

Patented Sept. 10, 1929.

1,727,554

UNITED STATES PATENT OFFICE.

RAYMOND B. MILLARD, OF TULSA, OKLAHOMA.

FILTER.

Application filed October 2, 1928. Serial No. 309,778.

This invention appertains to a novel device for filtering liquids of all characters and has for one of its primary objects to provide a filter in which the liquid is introduced into the bottom of the filter and allowed to percolate upwardly through the filtering material in contra-distinction to a filter using a downward flow of liquid.

Another important object of the invention is the provision of a filter embodying a body or housing provided with a detachable cover plate, the cover plate forming means for receiving the inlet and outlet tubes for the liquid to be filtered or rectified, the removable top also forming an efficient means for permitting the quick removal and refilling of the body with the desired filtering material.

A further object of the invention is the provision of a body receiving the filtering material having an open top with a removable cover therefore and means for clamping the cover in position on the top of the body, the cover being so formed as to permit the holding of filtering paper, cloth, or the like in contact with the open end of the body whereby the liquid percolating through the filtering material will be filtered by the paper as the liquid leaves the body, the removable top allowing the quick renewal of the filtering paper when the same becomes clogged.

A further object of the invention is the provision of novel means for controlling the flow of the liquid from the filter and thus control the rate of filtration.

A further object of the invention is the provision of a central inlet tube for the liquid carried by the removable cap of the filter, the inlet tube having novel means associated therewith for engaging the filtering paper so as to prevent seepage of the liquid past the paper and tube.

A still further object of the invention is to provide an improved filter of the above character, which will be durable and efficient in use, one which will be simple and easy to manufacture, and one which can be placed upon the market at a very reasonable cost.

With these and other objects in view, the invention consists in the novel construction, arrangement and formation of parts, as will be hereinafter more specifically described, claimed, and illustrated in the accompanying drawings, in which drawings:—

Figure 1:
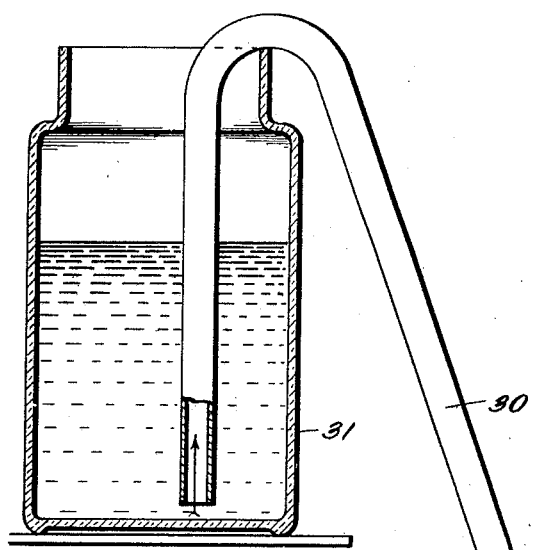
Figure 1 is a vertical section through the complete filtering apparatus showing the same in use.

Referring to the drawings in detail, wherein similar reference characters designate corresponding parts throughout the several views, the letter A generally indicates the improved filtering apparatus, which comprises a jar 10 which can be of any desired size and made of any desired material such as glass, porcelain, or the like. As shown, the jar 10 includes the side wall 11 and the bottom wall 12. The upper end of the jar is left open and is provided with a wide entrance neck 13 which may be externally screw threaded for the reception of a retaining cover ring 14. The upper end of the jar is adapted to be normally closed by a novel cover plate 15, which will be hereinafter more fully described. As shown, the cover retaining ring 14 is provided with an inwardly directed annular flange 16 for engaging the cover plate 15 for holding the same in intimate contact with the upper edge of the neck 13. If preferred a gasket 16' can be interposed between the flange 16 and the cover 15.

The jar 10 receives any preferred type of filtering medium and, as shown, the jar is filled to a point substantially up to the neck 13 with filtering material 17 which can be in the nature of fine charcoal or sand. A bed 18 of wire mesh gauze or perforated metal disc can be placed upon the upper surface of the filtering material 17 after which other filtering material 19 such as lump charcoal can be placed thereon. It is to be noted that I have shown a segration of filtering material. This is essential for the progressive or series treatment of liquid. In other words, one might wish to first strain sediment through sand and then progressively deodorize, deflavorize, then progressively revivify color and flavor. This type of filter is amenable to such treatment due to the fact that there is little, if any tendency, for the material to allocate in stratas other than those in which they were first placed.

This is not true in a filter utilizing a downward flow of liquid, where the finer particles work their way through the larger particles until they finally lodge at or near the bottom of the filter. This prevents even approximate lamination of different filtering materials and absolutely obviates progressive or series filtration in one container.

I also utilize a sheet of filtering paper or filtering cloth 20 which filtering paper is disposed directly between the cover 15 and the upper end of the neck 13. Thus the filtering paper also acts in the nature of a gasket for the cover. It is to be also noted that by having the wide mouth jar with the removable cover that the filtering paper can be quickly removed and replaced when so desired. Further the entire jar can be cleaned and new material placed in the same with little or no trouble.

Referring more particularly to the cover 15, the same can be made of any desired material, such as hard rubber, glass, porcelain or the like and is provided with a central boss 21, which boss also defines a central depending collar or abutment 22 the purpose of which will be later described. This boss 21 receives the central liquid inlet tube 23ª which tube extends into the jar and terminates slightly short of the lower end of the filtering material and thus it can be seen that the liquid introduced into the jar percolates upward through all of the different layers of filtering material. At one side of the central boss 21, the cover 15 is provided with a second boss 23 for the reception of an outlet tube 24, which permits the flow of the liquid from the jar after the filtering thereof. The liquid from the outlet tube 24 can be received in any preferred type of container, glass or the like and as shown I have provided a jar 25 for this purpose. The tube 24 can receive a downwardly bent tube 26 so that the liquid filter can be readily introduced into the said jar.

A valve or hand stop-cock 27 is interposed in the length of the tube 26 and by manipulating this valve or pet cock the rate of filtration can be readily controlled. The upper end of the central inlet tube 23ª extends above the boss 21 and forms a nipple for receiving the liquid inlet pipe and this pipe can be connected with any suitable source of supply, such as a reservoir tank, water faucet, or the like. In the present instance I have shown the upper end of the central inlet tube 23 connected with a siphon 30, the short leg of which is inserted in a suitable liquid container 31.

Again referring to the cover 15 it is to be noted that the same is provided with a relatively wide flat peripheral flange 32 which engages the top of the jar and that this flange is offset laterally from the body of the cover so as to lie in a plane below the same for effectively engaging the filtering paper 20. The lower face of the cover 15 can be provided with radially extending ribs 33 which extend from the central boss 21 toward the peripheral flange 32. These ribs 33 not only act to strengthen the cover but also act as means for insuring the spacing of the filtering paper from the top of the cover so as to allow the free upward flow of the liquid through the filtering paper. The ribs can be provided with notches 34 if preferred, in order to permit the flow of liquid from one pocket to the other, the pockets being defined by the ribs 33, the flange 32, and the central boss 21.

The filtering action is accomplished by the slow ascent of the liquid through the porous filtering bed of sand, charcoal, or other filtering medium. By proper selection of filtering materials, substances may be effectively and rapidly clarified, purified, deodorized and decolorized. Objectional flavors may also be removed by this efficient filter with its obvious intimate contact between material to be filtered and the filtering medium thereby assuring a filtrate of uniform quality and of positive flow regardless of the nature of the liquid or of the sediments contained therein.

It can be seen that the liquid to be filtered passes upward through the filter paper 20, not downward as in the usual practice. In a "downshot" filter the entire weight of the filter material and liquid presses upon the filter paper. This weight tends to pack the filtering material. It clogs the pores of the filter paper and when taken together with the ever increasing amount of filtered sediment, filter pores become obstructed to the point where all filtration is arrested.

In this filter, having the filter paper above, obviates these disadvantages. By admitting the liquid at the bottom the upward velocity of the liquid tends to prevent the filtering medium, (charcoal or equivalent) from settling into an impervious mass. No weight other than the velocity head of the liquid bears upon the filter paper. Consequently, this paper remains practically free of sediment. In other words, the force of gravity about balances the velocity head thereby preventing fine particles from impinging and adhering to the filter surface. In this filter, the particles are practically in suspension and only the more flocculent particles need be handled by the filter paper. Thus the filter is of great capacity and a large amount of liquid can be filtered through a given area using this apparatus.

Figure 5:
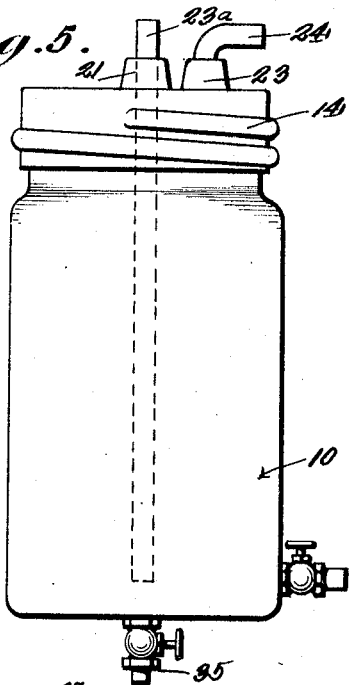
Figure 5 is a side elevation of the filtering jar showing a modified form thereof.
Figure 5:
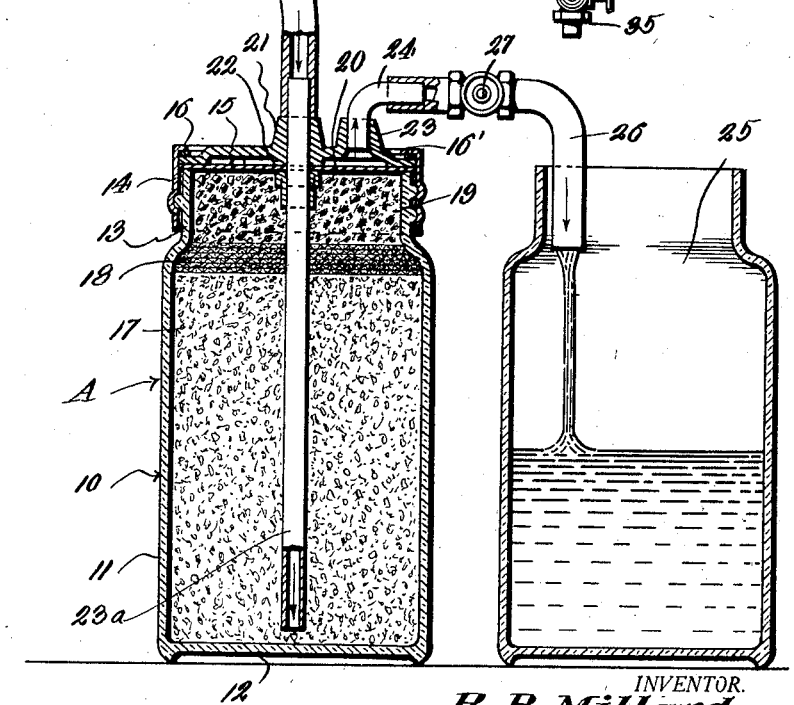
Figure 2:
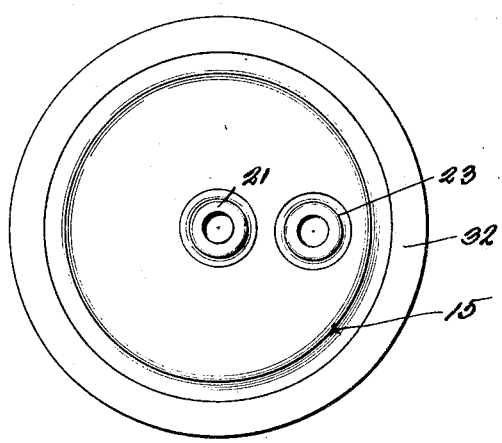
Figure 2 is a top plan view of the novel cap or cover for the filtering jar.
Figure 3:
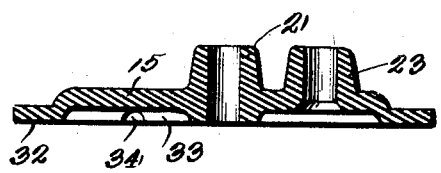
Figure 3 is a diametric section through the cap or cover of the filtering jar.
Figure 4:
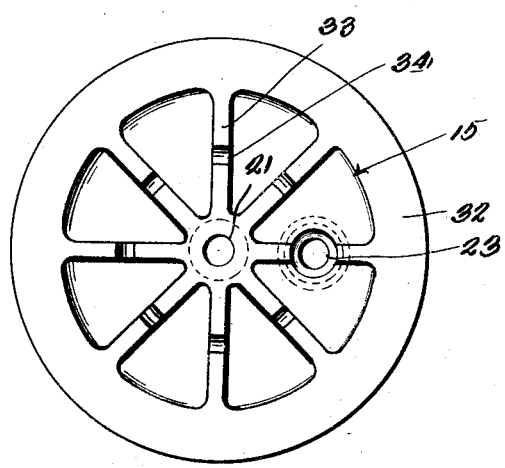
Figure 4 is a bottom plan view of the cover or cap for the filtering jar.

In Figure 5 of the drawings I have shown a slightly modified form of filter jar 10 in which, the bottom wall 12 can be provided with a pet-cock 35 and the side wall adjacent to the lower end thereof with a similar pet-cock 36. If preferred, either one of these pet cocks can be utilized as the inlet for the liquid to be filtered and these pet cocks can also be used as drain cocks.

Changes in details may be made without departing from the spirit or the scope of this invention, but:—

What I claim as new is:

1. In a filtering device, a jar having a large entrance neck at its upper end, filtering material in said jar, filtering paper fitted over the upper end of said neck, a removable cover for said neck including a flat peripheral flange for engaging the edge of the filtering paper and for holding the same on said neck, means engaging the cover for holding the same in intimate contact on said neck, spacing ribs carried by the cover for engaging the filtering paper, and inlet and outlet tubes carried by said cover, the inlet tube extending through the filtering paper and filtering material and terminating short of the lower end of said jar.

2. A filter comprising a jar having an open upper end, a removable cover for said open end, inlet and outlet tubes carried by said cover, said inlet tube extending into the jar and terminating slightly short of the bottom thereof, a layer of fine filtering material in said jar substantially rigid, filtering screens resting upon and supported by said material, a layer of coarse filtering material resting upon and supported by said screens for effectually keeping the filtering mediums separated, and filtering paper interposed between the cover and the upper edge of said jar.

3. In a filtering device, a filtering jar having an open end, a removable cover for said open end, filtering material in said jar, means for clamping the cover on said jar, said jar having an inlet boss, an inlet tube extending through said boss and through the filtering material and terminating short of the lower end of said jar, a sheet of filtering material interposed between the cover and the upper edge of said jar and acting to form a gasket between the jar and cover, and a sealing ring carried by said inlet tube engaging the lower face of said filtering paper for holding the same against said boss.

In testimony whereof I affix my signature.

RAYMOND B. MILLARD.